Nov. 15, 1949     H. M. ELSEY     2,488,387

ENCLOSED DYNAMOELECTRIC MACHINE

Filed March 6, 1948

WITNESSES:
Robert C. Baird
Robert E. Ross

INVENTOR
Howard M. Elsey.
BY Frederick Shapoe
ATTORNEY

Patented Nov. 15, 1949

2,488,387

UNITED STATES PATENT OFFICE 2,488,387

ENCLOSED DYNAMOELECTRIC MACHINE

Howard M. Elsey, Oakmont, Pa., assignor to Westinghouse Electric Corporation, East Pittsburgh, Pa., a corporation of Pennsylvania Application March 6, 1948, Serial No. 13,424

5 Claims. (Cl. 171—252)

This invention relates generally to dynamoelectric machines, and more particularly to a dynamoelectric machine having a sealed casing with means for adsorbing deleterious vapors from the interior thereof.

In the manufacture of dynamoelectric machines, it is customary to impregnate the electrical windings with an insulating resin dissolved in a volatile solvent, and thereafter drive off the solvent and cure the resin by baking the coils at an elevated temperature. A class of resins known as organopolysiloxanes has been found to be especially satisfactory for this purpose, inasmuch as they are capable of withstanding higher temperatures developed during operation of the machine than previously known resins.

Organopolysiloxanes suitable for this use may be obtained by the hydrolysis and chemical condensation of one or more hydrolyzable silicon compounds having the general formula $R_nSiX_{(r-n)}$ where R is selected from the group consisting of alkyl, alkyenyl, aralkyl and aryl radicals, X is a hydrolyzable group selected from the group consisting of halogen and alkoxy groups, and $n$ is a number from 1 to 2.25. Examples of such compounds are dimethyl silicon diethoxide; ethyl methyl phenyl silicon chloride having a ratio of R to Si of from 1 to 2.25, and a ratio of methyl to phenyl varying from 0.5 to 2; bis (trifluoromethyl) silicon difluoride; methallyl methyl silicon diethoxide; methyl tolyl silicon diethoxide, and so forth. The hydrolysis products chemically condense either spontaneously or in the presence of heat and dehydrating agents, to polysiloxanes that are initially fluids, but which increase in viscosity on heating to temperatures of between 100° C. and 250° C., and become hard resinous bodies with an increased molecular weight resulting from chemical condensation. The liquid polysiloxanes may be applied either directly to the electrical windings or may be applied in solution in toluene or other benzenoid solvents, the solvent being evaporated by the baking treatment, and the liquid polysiloxane then polymerized to a solid resin, usually with a catalyst such as lead napthenate or ferric chloride.

In certain applications of dynamoelectric machines utilizing carbon brushes in sliding contact with commutators or slip rings for transfer of electric current therebetween, it is necessary that the machine operate in a sealed or gas tight casing either to prevent damage to the machine by deleterious substances in the surrounding atmosphere, or to prevent explosions due to ignition of vapors in the surrounding atmosphere by electrical discharges at the brushes of the machine.

In such applications it has been found that the enclosed machines having windings insulated with a polysiloxane resin are subject to an extremely high rate of brush wear. For example, on a particular enclosed machine where the normal brush wear is about .1 mil per hour, the brush wear increases to nearly 1 mil per hour when the electrical windings of the machine were impregnated with a polysiloxane resin.

The precise cause of the excessive rate of brush wear has not been definitely determined. It is well known that a factor having a great influence on the rate of brush wear is the condition of the surface of the copper commutator. During normal operation, a thin protective film of copper oxide forms on the commutator surface, which evidently reduces the friction between the commutator and the brushes. Failure of this film may cause increased friction and seizure between the commutator and the brush resulting in a higher rate of brush wear.

It is believed that the temperatures created in the windings of the machine during operation may cause decomposition or volatilization of part of the polysiloxane resin insulation. The evolved substances or vapors resulting from such decomposition may be adsorbed on the surface of the commutator, to form a very stable film which apparently is very abrasive, inasmuch as the rate of brush wear is greatly increased.

The object of the invention is to provide for adsorbing deleterious compounds evolved from polysiloxane resin insulation on the windings of a sealed dynamoelectric machine before the compounds can contact the commutator and be adsorbed thereon.

A more specific object of the invention is to prevent excessive brush wear in enclosed dynamoelectric machines having electrical windings insulated with a polysiloxane resin by adsorbing deleterious compounds evolved from the insulation during operation of the machine.

For a fuller understanding of the nature and objects of the invention, reference should be had to the following detailed description taken in conjunction with the accompanying drawing, in which.

Figure 1:
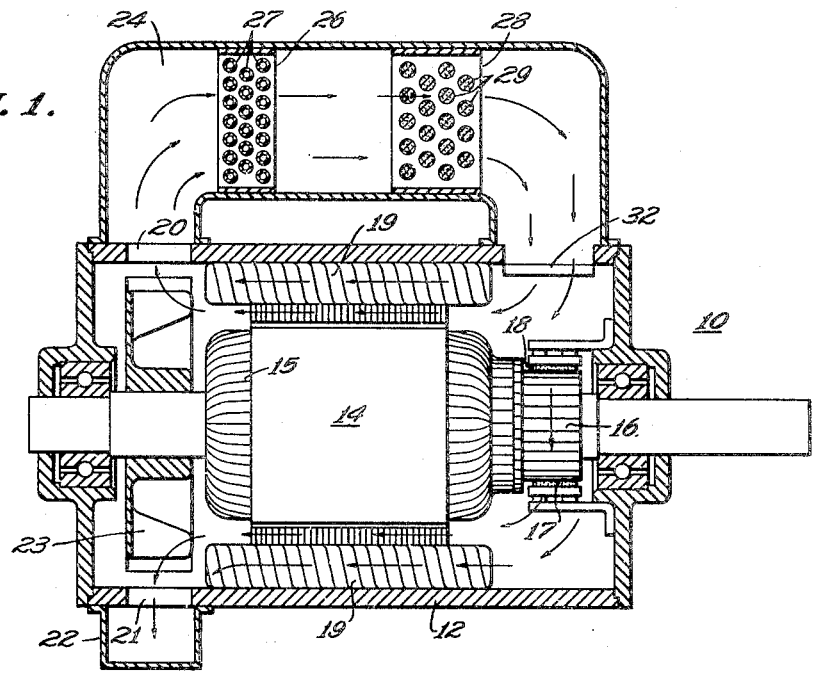
Figure 1 is a view in elevation partly in section of a dynamoelectric machine embodying the features of the invention.

Referring now to Fig. 1, there is illustrated a dynamoelectric machine 10, which is enclosed in a sealed casing 12. The machine 10 comprises a rotor 14 having windings 15 disposed thereon which have been insulated with a polysiloxane resin.

A copper commutator 16 composed of individual segments insulated from one another is mounted on one end of the rotor 14, the individual segments being connected to the electrical windings 15 of the rotor. Carbon brushes 17 and 18 are disposed in slidable contact with the commutator 16 for transfer of electric current therebetween. A fan 23 is mounted on the opposite end of the rotor 14 for circulating the atmosphere within the casing in a manner to be hereinafter described. The stator windings 19, which are insulated with a polysiloxane resin, are disposed about the rotor in the usual manner. The casing 12 is provided with a number of openings, such as those shown at 20 and 21, to permit the flow of gas from within the casing 12 outwardly to the annular conduit 22, which is directly connected to one end of a chamber 24.

The opposite end of the chamber 24 is directly connected to the casing 12, and an opening 32 is disposed therein to permit passage of the gas from the chamber 24 into the casing 12. A cooler 26 is disposed in the chamber 24 to cool the gases passing therethrough. The cooler 26 comprises a plurality of tubes, generally shown at 27 through which water or other suitable cooling fluid may be circulated.

In order to remove deleterious compounds evolved from the polysiloxane resin insulation and carried by the circulated atmosphere, a filter 28 is disposed in chamber 24 to adsorb the compounds passing therethrough before they can contact the commutator 16. The filter 28 comprises a plurality of porous tubes 29 containing a solid adsorbent material, such as activated carbon, activated alumina or silica gel.

Figure 3:
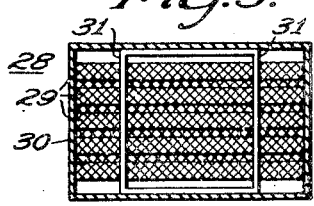
Fig. 3 is a view in elevation partly in section of an adsorbent filter utilized in the embodiment of the invention illustrated in Fig. 1.

Referring to Fig. 3, there is illustrated a view in elevation and partly in section of the filter 28. The tubes 29 are formed of a wire mesh filled with the solid adsorbent material. The tubes 29 are held in place by means of a frame 30 into which the ends of the tube 29 are fitted and by intermediate braces, such as those illustrated at 31.

Referring again to Fig. 1, the filter 28 is so constructed and disposed in the chamber 24 in the path of the gases flowing therethrough as to impart turbulent flow to the gases, to provide efficient contact between the gases and the adsorbent material.

During operation of the machine, the rise in temperature of the rotor windings 15 and the stator windings 19 causes deleterious products and vapors of unknown composition to be evolved from the polysiloxane insulation thereon. The fan 23 exhausts the gas carrying the evolved vapors from the interior of the casing 12 into the chamber 24 through the annular conduit 22 thence over the cooler 26 and through the filter 28. The adsorbent material contained in the tubes 29 adsorbs the vapors which have been evolved from the windings, thereby preventing them from reaching the commutator. The turbulent flow imparted to the air by spacing of the tubes 29 provides efficient contact between the air and the adsorbent material.

Figure 2:
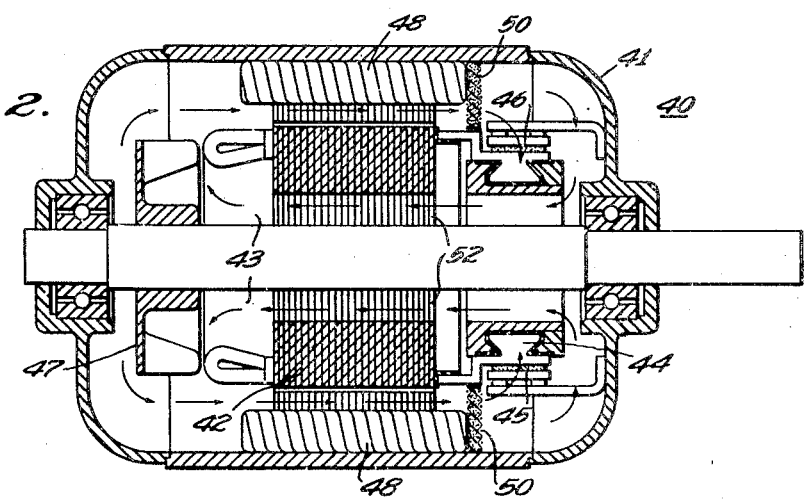
Fig. 2 is a view in elevation, partly in section, showing another manner of embodying the invention in a dynamoelectric machine.

Referring to Fig. 2, there is illustrated an enclosed dynamoelectric machine embodying the invention for service where cooling devices are not required. The machine 40 is enclosed by a sealed casing 41 in which is disposed a rotor 42 having windings 43 insulated with a polysiloxane resin. The rotor 42 is provided with passages, generally illustrated at 52, to permit flow of air through the interior thereof. Mounted on the rotor in the usual manner is a commutator 44 composed of individual segments insulated from one another, which are connected to the windings 43 of the rotor.

Carbon brushes 45 and 46 are disposed in slidable contact with the commutator 44 to effect transfer of electric current therebetween. A fan 47 is mounted on the rotor 42 for circulating the atmosphere within the casing. Stator windings 48 insulated with a polysiloxane resin are disposed about the rotor 42 in the usual manner. A filter 50 is disposed in the casing in the path of the gas flow to adsorb deleterious products and vapors from the gas. The filter 50 comprises a solid adsorbent material which is held in place by a wire mesh.

In the preferred embodiment, the filter 50 is formed into a flat annular ring of the proper size to be mounted within the casing 41. The operation of the device is similar to that previously described in connection with the embodiment of Fig. 1. The fan 47 circulates the gas within the casing to cause the gas to pass over the rotor windings 43 and stator windings 48 to carry away the evolved polysiloxane compounds, and to cause the gas carrying such evolved vapors to pass through the filter 50 whereby the vapors are adsorbed. The gases thereafter pass over the brushes 45 and 46 and through the passages 52 back to the rotor.

In the preferred embodiments of the invention illustrated, the flow of gas has been described as passing in sequence over the windings, the adsorbent material and the brushes. This sequence of gas flow has been found to be advantageous since the deleterious vapors are removed from the gases immediately before the gases pass over the commutator. While the filter 28 in Fig. 1 is not 100% efficient in removing the polysiloxane vapors from the gas in a single pass, that is, all of the air may not contact the adsorbent material while passing through the filter, the continuous circulation of air through the filter during the operation of the machine will maintain the concentration of deleterious vapors evolved from the polysiloxane resin insulation sufficiently low to prevent the vapors from causing excessive wear of the carbon brushes.

The adsorbent material may be any solid material capable of adsorbing the polysiloxane vapors evolved from the insulation. It is preferred to use activated carbon, although activated alumina and silica gel have been used successfully. The gas in the casing is ordinarily air, but hydrogen may be used if more efficient cooling is required.

Tests conducted on enclosed motors having windings insulated with polysiloxane resin have shown that it is possible to radically decrease the rate of brush wear by the hereinbefore described method.

In a specific test, a 46 horsepower motor was operated at 1800 R. P. M. for 72 hours at full load without the adsorbent filter. The windings of the machine attained a temperature of 225° C. shortly after commencement of the test, and remained at that temperature throughout the test. The average rate of brush wear was found to be .68 mils per hour.

Another test was then conducted with all conditions the same, with the exception that an adsorbent filter was inserted as illustrated in Fig. 1. In this test the average rate of brush wear was found to be only .12 mils per hour.

A dynamoelectric machine embodying the invention is particularly applicable to installation where the machine is to be subjected to severe service, with a limited supply of ventilating air, and where the machine must be enclosed to prevent the arcing which frequently occurs at the brushes from igniting inflammable gases in the surrounding atmosphere.

Since certain changes may be made in the invention, and different embodiments of the invention could be made without departing from the scope thereof, it is intended that all matter contained in the above description or taken in connection with the accompanying drawing shall be interpreted as illustrative and not in a limiting sense.

I claim as my invention:

1. In a dynamoelectric machine having in a sealed casing, carbon brushes to effect transfer of electric current, and having electrical windings insulated with polysiloxane, the polysiloxane evolving deleterious compounds during operation of the machine which results in excessive wear of the carbon brushes, in combination, a solid adsorbent material and means for circulating the atmosphere in the casing over the solid adsorbent material to remove compounds evolved from the polysiloxane.

2. In a gas-tight dynamoelectric machine utilizing carbon brushes in sliding contact with a rotating contact member to effect transfer of electric current, and having electrical windings insulated with polysiloxane, the polysiloxane evolving deleterious compounds during operation of the machine which cause excessive wear of the carbon brushes, in combination, a solid adsorbent material and means for circulating the atmosphere in the casing in sequence over the electrical windings, the solid adsorbent material and the carbon brushes.

3. In a sealed dynamoelectric machine utilizing carbon brushes to effect transfer of electric current, and having electrical windings insulated with polysiloxane, the polysiloxane evolving compounds during operation of the machine which cause excessive wear of the carbon brush, in combination an activated carbon filter and means for circulating the atmosphere in the casing through the activated carbon filter to remove the compounds evolved from the polysiloxane.

4. A dynamoelectric machine having a sealed casing, rotatable contact member, a carbon brush in contact with the rotatable contact member, electrical windings connected to the rotatable contact member, an insulation comprising polysiloxane on the electrical windings, the polysiloxane evolving compounds during operation of the machine which cause excessive wear of the carbon brush, a solid adsorbent material, and means for circulating the atmosphere within the casing to cause the atmosphere to pass over the solid adsorbent material to adsorb compounds evolved by the polysiloxane before the atmosphere passes over the commutator.

5. A dynamoelectric machine having in combination, a sealed casing, a rotatable contact member, a carbon brush in slidable contact with the rotatable contact member, electrical windings connected to the rotatable contact member, insulation comprising polysiloxane on the electrical windings, the polysiloxane evolving compounds during operation of the machine which cause excessive wear of the carbon brush, a solid adsorbent material, and means for circulating the atmosphere in the casing to cause the atmosphere to pass in sequence over the electrical windings, the solid adsorbent material, and the rotatable contact member to remove the compounds evolved by the polysiloxane.

HOWARD M. ELSEY.

REFERENCES CITED

The following references are of record in the file of this patent:

UNITED STATES PATENTS

| Number | Name | Date |
|---|---|---|
| 1,686,027 | Newbury | Oct. 2, 1928 |
| 1,722,632 | Johnson | July 30, 1929 |
| 2,306,736 | Linville | Dec. 29, 1942 |

FOREIGN PATENTS

| Number | Country | Date |
|---|---|---|
| 490,062 | Great Britain | Aug. 9, 1938 |